United States Patent [19]

Ogawa et al.

[11] Patent Number: 4,572,263

[45] Date of Patent: Feb. 25, 1986

[54] PNEUMATIC RADIAL TIRE

[75] Inventors: Masaki Ogawa, Tokyo; Yasushi Hirata, Saitama; Akira Tsuchikura, Tokyo, all of Japan

[73] Assignee: Bridgestone Corporation, Tokyo, Japan

[21] Appl. No.: 556,818

[22] Filed: Dec. 1, 1983

[30] Foreign Application Priority Data

Dec. 1, 1982 [JP] Japan ................................ 57-209270

[51] Int. Cl.[4] .......................... B60C 9/18; B60C 9/04; B32B 25/10

[52] U.S. Cl. .................................... 152/537; 152/556; 152/560; 152/564; 152/565; 156/124; 156/910; 428/390; 428/625; 524/398

[58] Field of Search ............... 152/330 R, 374, 354 R, 152/356 R, 357 R, 359, 361 R, 355, DIG. 4; 156/910, 124; 524/398, 394, 571; 428/390, 625, 626

[56] References Cited

U.S. PATENT DOCUMENTS 4,169,112 9/1979 Elmer et al. .................... 524/100 X 4,330,592 5/1982 Tsukamoto et al. ................ 428/378

*Primary Examiner*—Lois E. Boland
*Assistant Examiner*—Thomas Bokan
*Attorney, Agent, or Firm*—Sughrue, Mion, Zinn, Macpeak & Seas

[57] ABSTRACT

A pneumatic radial tire comprising: (1) a cylindrical tread portion; (2) side portions located at both sides of the tread portion and extending inwardly in the radial direction; (3) bead portions located at the inner edge portions of the side portions; (4) a carcass comprising at least one ply which is reinforced with a belt arranged on the inside of the tread portion, wherein said belt and/or said carcass ply is reinforced by steel cords; and (5) a rubber composition surrounding the steel cords, wherein said rubber composition comprises: (a) 100 parts by weight of at least one rubber selected from the group consisting of natural rubber and dienic synthetic rubber; (b) 0.1-5.0 parts by weight of alkadiene sulfone; and (c) 0.05-1.0 parts by metal weight of at least one metal salt of an organic acid selected from the group consisting of cobalt salt of an organic acid and nickel salt of an organic acid.

6 Claims, No Drawings

PNEUMATIC RADIAL TIRE

FIELD OF THE INVENTION

This invention relates to a durable pneumatic radial tire reinforced with steel cords. More particularly, the present invention relates to the bonding of a rubber composition to steel cords such that excellent corrosion fatigue resistance and adhesion to the rubber composition is obtained.

BACKGROUND OF THE INVENTION

Pneumatic radial tires reinforced with steel cords have a disadvantage in that when they are used in a corrosive atmosphere rust occurs in the steel cords which lowers the tensile strength of the steel cords and deteriorates the adhesion between the steel cords and the rubber composition.

Rust in steel cords is caused by rain water or the like penetrating external injuries in the belt layers or a ply layer of the pneumatic radial tire. In addition, when a tire is set with a tube, a flap and a rim, water or the like remains in the gap between the tire and the tube. Over the course of time, the water or the like permeates the steel cords through the inner liner portion of the tire and causes rust in the steel cords.

Various attempts have been made to overcome the above-identified rust problem. Examples of the attempts include:

(1) employing from 0.1 to 3.0 parts by weight of an aromatic triazole in the rubber composition surrounding the steel cords, (see U.S. Pat. No. 4,169,112);

(2) employing metal salts of para-oxybenzoic acid and cobalt salts of fatty acids in the rubber composition surrounding the steel cords to improve the adhesion between the steel cords and the rubber composition (see Japanese Patent Laid Open No. 1356/77); and (3) employing a protective layer surface comprising a rust preventing material consisting of a surfactant and a film-former on the surface of the steel cords (see U.S. Pat. No. 4,330,592).

However, when tires are exposed to severe running conditions for a long period of time, the above-described attempts have not proved satisfactory.

SUMMARY OF THE INVENTION

An object of the present invention is to provide a pneumatic radial tire, wherein the steel cords contained therein exhibit excellent fatigue resistance and, wherein excellent adhesion is obtained between the steel cords and the rubber composition.

Another object of the present invention is to provide a pneumatic radial tire which exhibits excellent corrosion resistance for long periods of time in a corrosive atmosphere.

The above-described objects have been met by a pneumatic radial tire comprising:

(1) a cylindrical tread portion;

(2) side portions located at both sides of the tread portion and extending inwardly in the radial direction;

(3) bead portions located at the inner edge portions of the side portions;

(4) a carcass comprising at least one ply which is reinforced with a belt arranged on the inside of the tread portion, wherein said belt and/or said ply is reinforced by steel cords; and (5) a rubber composition surrounding the steel cords, wherein said rubber composition comprises:

(a) 100 parts by weight of at least one rubber selected from the group consisting of natural rubber and dienic synthetic rubber;

(b) 0.1–5.0 parts by weight of an alkadiene sulfone; and (c) 0.05–1.0 parts by metal weight of at least one metal salt of an organic acid selected from the group consisting of a cobalt salt of an organic acid and a nickel salt of an organic acid.

DETAILED DESCRIPTION OF THE INVENTION

As described above, the present invention relates to a pneumatic radial tire comprising:

(1) a cylindrical tread portion;

(2) side portions located at both sides of the tread portion and extending inwardly in the radial direction;

(3) bead portions located at the inner edge portions of the side portions;

(4) a carcass comprising at least one ply which is reinforced with a belt arranged on the inside of the tread portion, wherein said belt and/or said ply is reinforced by steel cords; and (5) a rubber composition surrounding the steel cords, wherein said rubber composition comprises:

(a) 100 parts by weight of at least one rubber selected from the group consisting of natural rubber and dienic synthetic rubber;

(b) 0.1–5.0 parts by weight of an alkadiene sulfone; and (c) 0.05–1.0 parts by metal weight of at least one metal salt of an organic acid selected from the group consisting of a cobalt salt of an organic acid and a nickel salt of an organic acid.

The present invention is effective for radial tires for passenger cars, light trucks, truck-buses and construction vehicles which have steel cord belt layers and/or a steel cord ply layer. The present invention is particularly useful for tires for heavy vehicles, such as radial tires for truck-buses, light trucks and construction vehicles.

Besides tires, the present invention can be broadly applied in the rubber industry and, for example, can be used for belts, hoses, rubber vibration isolators, fenders and the like.

Dienic synthetic rubbers useful in the present invention include: synthetic polyisoprene rubber, styrene-butadiene copolymer rubber, isoprene-butadiene copolymer rubber, polybutadiene rubber, ethylene-propylene-diene ternary copolymer rubber, acrylonitrile-butadiene copolymer rubber, propylene-butadiene copolymer rubber, isoprene-isobutylene copolymer rubber, halogenated isoprene-isobutylene copolymer rubber etc.

It has been disclosed in Japanese Patent Laid-Open Application No. 72,056/78, and *Rubber* 7:658 (1960) that alkadiene sulfones are used as an isomerizing agent to isomerize a part of the cis-1,4-structure in natural rubber or polyisoprene rubber into the trans-1,4-structure upon vulcanization. In addition, it is taught the alkadiene sulfones restrain crystallization of the rubber and improve the rupture strength of the vulcanized rubber.

Alkadiene sulfones useful in the present invention include: piperylene sulfone, 1,3-dimethylbutadiene sulfone, 2,3-dimethylbutadiene sulfone, 2,4-hexadiene sulfone, butadiene sulfone, isoprene sulfone, etc. Butadiene sulfone and isoprene sulfone are preferably employed.

If the amount of alkadiene sulfone is more than 5.0 parts by weight, the alkadiene sulfone remains even after vulcanization and is precipitated as needle crystals in the rubber after a long period of time, i.e., several hundred hours. The needle crystals then become a rupture nucleus of the rubber. As a result, the fatigue rupture resistance of the tire deteriorates. Thus, such an amount is not preferable. If the amount of alkadiene sulfone is less than 0.1 parts by weight, the synergistic effects with the metal salts of an organic acid are not achieved.

It is preferable in the present invention to use the alkadiene sulfone in an amount of not more than 1.5 parts by weight for preventing the occurrence of alkadiene sulfone crystals.

The organic acids employed for metal salts of organic acids in the present invention include: naphthenic acid, stearic acid, palmitic acid, oleic acid, linoleic acid, 2-ethylhexanoic acid, resin acids (including abietic acid and tall oil acid), neodecanoic acid, versatic acid and primary fatty acids having 6–10 carbon atoms. Examples of such primary fatty acids having 6–10 carbon atoms include: caproic acid, isocaproic acid, enanthic acid, caprylic acid, isocaprylic acid, pelargonic acid, capric acid, and isocapric acid. (Note, 2-ethylhexanoic acid, neodecanoic acid and versatic acid are condensed synthetic fatty acids.)

In the present invention it is preferable to use the metal salts of primary fatty acids having 6–10 carbon atoms in combination in order to provide excellent corrosion resistance and resistance to adhesion deterioration caused by penetrating water.

The metal salts of the organic acids employed in the present invention may be cobalt salts or nickel salts.

When the cobalt and/or nickel salts of organic acids are used in an amount of less than 0.05 parts by metal weight of cobalt and/or nickel, the synergistic effect cannot be achieved. Further, when the cobalt and/or nickel salts of organic acids exceed 1.0 part by metal weight of cobalt and/or nickel, the adhesion of the rubber composition to the steel cords, particularly the heat aging adhesion resistance is lowered. Thus, such amounts are not preferable.

In the present invention, other additives may be employed in the rubber composition such as carbon black, other types of filler, a vulcanizing agent, a vulcanization accelerator, an accelerator activator, a vulcanization retarder, an antioxidant, a softener, a plasticizer, a tackifier, a peptizing agent and the like.

Examples of carbon black useful in the present invention include: hard type furnace carbon black (HAF, IISAF, etc.), soft type furnace carbon black (FEF, GPF, etc), channel carbon black and acetylene carbon black. The amount of carbon black employed is usually 20–100 parts by weight per 100 parts by weight of rubber.

Other types of fillers useful in the present invention include: hydrated silicic acid, anhydrous silicic acid, hard clay, soft clay, magnesium carbonate, calcium carbonate and diatomaceous earth. The amount of these fillers is usually 20–100 parts by weight per 100 parts by weight of rubber.

Examples of vulcanizing agents useful in the present invention include: sulfur, sulfur chloride, 4,4′-dithiobisdimorphorine (Barnock R, made by Ohuchi Shinko Kagaku Kogyo Co., Ltd.), alkyl phenol polysulfide, etc. The vulcanizing agents are usually employed in an amount of from 2–10 parts by weight per 100 parts by weight of rubber.

The preferable vulcanization accelerator useful in the present invention is sulfeneamide which can be used in an amount of from about 0.5–5 parts by weight per 100 parts by weight of rubber.

Examples of accelerator activators useful in the present invention include (ZnO), fatty acids, such as stearic acid, resin acids and the like. It is preferable to use zinc white (ZnO) in an amount of more than 3 parts by weight per 100 parts by weight of rubber.

An example of a vulcanizer retarder useful in the present invention is Santogard PVI (Monsanto Co., Ltd) which is employed in an amount of from 0–1.0 parts by weight per 100 parts by weight of rubber.

Examples of antioxidants useful in the present invention include 2,6-di-tert-butyl-p-cresol and N-isopropyl-N′-phenyl-p-phenylene diamine, which are employed in an amount of from 0.1–5.0 parts by weight per 100 parts by weight of rubber.

Examples of softeners useful in the present invention include naphthenic oil, paraffinic oil and aromatic oil, which are employed in an amount of from 0–20 parts by weight per 100 parts by weight of rubber.

Examples of plasticizers useful in the present invention include dimethylphthalate, dibutylphthalate, diethyleneglycol and dibenzoate, which are employed in an amount of from 0–20 parts by weight per 100 parts by weight of rubber.

Examples of peptizing agents useful in the present invention include O.O′-dibenzoamidodiphenyldisulfide and zinc-2-benzoamidothiophenate, which are employed in an amount of from 0–2.0 parts by weight per 100 parts by weight of rubber.

The following examples are given for the purpose of illustrating the present invention and are no way intended to limit the scope thereof.

EXAMPLE 1

Eleven different kinds of rubber compositions for surrounding the steel cord having the compounding ratios shown in Table 1 below, were prepared by kneading the components by means of a Banbury mixer.

Alkadiene sulfones were added with 15 parts by weight of carbon black HAF to natural rubber (80 parts by weight), synthetic polyisoprene rubber (10 parts by weight) and polybutadiene rubber (10 parts by weight).

The kneaded rubber compositions were formed into sheets each having a thickness of about 2 mm.

Plural steel cords arranged in parallel, which were layer twisted $(3+9+15)\times 0.175+1$ and plated with brass (Cu/Zn=65/35) were then surrounded by the formed sheets.

The laminated composites comprising the rubber compositions and the steel cords were cured at a high pressure and a temperature of 145° C. for 45 minutes. The laminate compositions were arranged so as to have a length of 200 mm, a width of 30 mm and a thickness of 4 mm.

Original adhesion, adhesion deterioration caused by penetrating water, corrosion fatigue resistance and flex crack resistance were determined with respect to the above described 11 different types of cured laminated composites. The results obtained are shown in Table 1 below.

The evaluation means are described below:

ORIGINAL ADHESION

The steel cords were peeled off from the cured laminated composites and the adhesion was evaluated by a determination of the amount of rubber that remained on the cords. The state were rubber remained on more than 90% of the separated cord surface is referred to as "A", 65% to 90% is referred to as "B", 40% to less than 65% is referred to as "C", 15% to less than 40% is referred to as "D" and less than 15% is referred to as "E".

ADHESION DETERIORATION CAUSED BY PENETRATING WATER

The cured laminated composites were left for 40 days in the salt water sprayer described in JIS Z 2371 (5±1% NaCl at 35±2° C.). Then, the adhesion was determined in the same manner as in the Original Adhesion described above.

CORROSION FATIGUE RESISTANCE

Repeated bending of the cured laminated composites (bending angle of 90° C.) was carried out in the salt water sprayer under the same conditions as described above.

After bending 300,000 times, the steel cords were peeled off from the cured laminated composites and the filament breakage ratio of the steel cords was estimated from the number of broken filaments at the maximum inflection point of the steel cords.

A spiral filament wrapping the steel cord was not considered a broken filament in this estimation.

The strength retention ratio of the cord was also estimated by the following formula:

$$\text{strength retention ratio} = \frac{\text{strength after repeated bending}}{\text{strength prior to fatigue}} \times 100$$

FLEX CRACK RESISTANCE

The eleven different types of rubber compositions shown in Table 1 were cured at a high pressure and at a temperature of 145° C. for 45 minutes. Then, the rubber compositions were formed into samples having no cuts in the hollow part of the samples as described in flexing test JIS K 6301.

The samples were left for about 240 hours so that crystals of the remaining alkadiene sulfone grew. Then, the samples were tested with a de Mattia flexing tester (see JIS K 6301) at a rate of 300 cycles/min. Each sample was measured ten times.

Flex crack resistance was measured by the following formula:

$$\text{Flex crack resistance} = \frac{\text{The average time until a primary crack occurs in the test sample}}{\text{The average time until a primary crack occurs in Rubber Composition No. 1}} \times 100$$

TABLE 1

| Rubber Composition No. | 1 Comparative Example | 2 Example | 3 Example | 4 Example | 5 Comparative Example | 6 Comparative Example | 7 Example | 8 Example | 9 Example | 10 Example | 11 Example |
|---|---|---|---|---|---|---|---|---|---|---|---|
| Natural rubber (RSS#1) | 80 | 80 | 80 | 80 | 80 | 80 | 80 | 80 | 80 | 80 | 80 |
| Polyisoprene rubber (IR2200) | 10 | 10 | 10 | 10 | 10 | 10 | 10 | 10 | 10 | 10 | 10 |
| Polybutadiene rubber (BR01) | 10 | 10 | 10 | 10 | 10 | 10 | 10 | 10 | 10 | 10 | 10 |
| Carbon black (HAF) | 50 | 50 | 50 | 50 | 50 | 50 | 50 | 50 | 50 | 50 | 50 |
| Cobalt naphthenate*[1] | 2 | 2 | 2 | 2 | 2 | 0.4 | 0.8 | 2 | 2 | — | — |
| Nickel naphthenate*[2] | 1 | 1 | 1 | 1 | 1 | — | — | 1 | — | — | — |
| Cobalt caproate*[3] | — | — | — | — | — | — | — | — | — | 1.6 | — |
| Cobalt caprate*[4] | — | — | — | — | — | — | — | — | — | — | 1.5 |
| Nickel caprylate*[5] | — | — | — | — | — | — | — | — | 0.6 | — | 0.6 |
| Butadiene sulfone | — | 0.1 | 1.5 | 4.5 | 5.5 | 1.5 | 1.5 | — | 1.5 | 1.5 | 1.5 |
| Isoprene sulfone | — | — | — | — | — | — | — | 1.5 | — | — | — |
| Antioxidant*[6] | 1 | 1 | 1 | 1 | 1 | 1 | 1 | 1 | 1 | 1 | 1 |
| ZnO | 5 | 5 | 5 | 5 | 5 | 5 | 5 | 5 | 5 | 5 | 5 |
| Accelerator*[7] | 0.6 | 0.6 | 0.8 | 1.0 | 1.0 | 1.2 | 0.8 | 0.8 | 0.8 | 0.8 | 0.8 |
| Sulfur | 5 | 5 | 5 | 5 | 5 | 5 | 5 | 5 | 5 | 5 | 5 |
| Metal weight (parts) | 0.31 | 0.31 | 0.31 | 0.31 | 0.31 | 0.042 | 0.084 | 0.31 | 0.307 | 0.315 | 0.313 |
| Original adhesion | A | A | A | A | A | B | A | A | A | A | A |
| Adhesion deterioration caused by penetrating water | E | C | B | B | B | E | C | B | B | B | B |
| Corrosion fatigue resistance — filament breakage ratio (%) | 24 | 17 | 11 | 9 | 9 | 33 | 15 | 13 | 7 | 6 | 6 |
| Corrosion fatigue resistance — strength retention ratio of cord (%) | 59 | 68 | 75 | 78 | 77 | 48 | 71 | 73 | 84 | 87 | 86 |
| Flex crack resistance | 100 | 100 | 100 | 85 | 30 | 90 | 100 | 100 | 100 | 100 | 100 |

*[1]: Cobalt content 10.5 wt %
*[2]: Nickel content 10.0 wt %
*[3]: Cobalt content 19.7 wt %
*[4]: Cobalt content 14.4 wt %
*[5]: Nickel content 16.2 wt %
*[6]: N—(1,3-dimethyl-butyl)-N'—phenyl-p-phenylenediamine
*[7]: N,N'—dicyclohexyl-2-benzothiazolylsulfenamide Table 1 above shows that the combined use of alkadiene sulfone and cobalt and/or nickel salts of organic acids remarkably improves corrosion fatigue resistance and adhesion deterioration caused by water penetrating into the embedded steel cord.

Furthermore, as shown in Table 1 above, it is necessary to compound not more than 5 parts by weight of alkadiene sulfone, because the use of more than 5 parts by weight of alkadiene sulfone does not improve the corrosion fatigue resistance and adhesion deterioration caused by penetrating water, and in fact deteriorates flex crack resistance.

EXAMPLE 2

Rubber compositions No. 1, 3, 5, 6, 8 and 11 shown in Table 1 above were employed as the surrounding rubber compositions of belt layers and a carcass ply layer to produce 6 types of radial tires for a truck-bus having a size of 10.00 R 20 and a 14 ply rating. The details of these six tires are as follows:

| | |
|---|---|
| Belt layers | 4 sheets |
| Cord used | (3 + 6) × 0.38 (brass plating Cu/Z 65/35) |
| End number | 14 cords/2.5 cm |
| Carcass layer | 1 sheet |
| Cord used | (3 + 9 + 15) × 0.175 + 1 (brass plating Cu/Zn = 65/35) |
| End number | 14 cords/2.5 cm |

These tires were set in long-running trucks after sealing 300 ml of water between the tire and the tube (300 ml of water was added at intervals after running the tires for 25,000 km). Six cuts, 20 cm long, were made in the radial direction in the crown center portion of the tire tread and reached to the outmost belt layer (No. 4 belt layer).

After running 100,000 km, the tires were retrieved and the adhesion state of the belt layers and the corrosion state of the ply layer were estimated.

The adhesion state of the belt layers was estimated by measuring the adhesion state of the steel cords 10~50 mm apart from the cut in the outermost belt layer (No. 4 belt layer). The adhesion state of the steel cords in the inner belt layer (No. 3 belt layer) was also measured for comparison with that in the outermost belt layer.

The corrosion state of the carcass ply layer was estimated by randomly sampling a total of 80 steel cords from four different shoulder portions and measuring the filament breakage ratio.

The results obtained are shown in Table 2 below.

TABLE 2

| Tire No. | | 1 Comparative Example | 2 Example | 3 Comparative Example | 4 Comparative Example | 5 Example | 6 Example |
|---|---|---|---|---|---|---|---|
| Rubber Composition No. in Table 1 | | 1 | 3 | 5 | 6 | 8 | 11 |
| Adhesion state of belt layers | The outermost belt layer (No. 4 belt layer) | D | C | Breakdown on the road | E | C | B |
| | The inner belt layer (No. 3 belt layer) | B | B | | D | B | B |
| Corrosion state of carcass ply layer (%) | | 17 | 11 | | 24 | 9 | 4 |

In Table 2, tire No. 3 (composition No. 5) could not be estimated because it brokedown on the road as a result of separation by the belt end.

Table 2 shows that the combined use of alkadiene sulfone and cobalt and/or nickel salts of organic acids in the rubber composition surrounding the steel cords provides excellent effects in terms of the durability of the tires.

While the invention has been described in detail and with reference to specific embodiments thereof, it will be apparent to one skilled in the art that various changes and modifications can be made therein without departing from the spirit and scope thereof.

What is claimed is:

1. A pneumatic radial tire comprising:
(1) a cylindrical tread portion;
(2) side portions located at both sides of the tread portion and extending inwardly in the radial direction;
(3) bead portions located at the inner edge portions of the side portions;
(4) a carcass comprising at least one ply which is reinforced with a belt arranged on the inside of the tread portion, wherein said belt, said carcass ply or both said belt and said carcass ply are reinforced by steel cords; and
(5) a rubber composition surrounding the steel cords, wherein said rubber composition comprises:
(a) 100 parts by weight of at least one rubber selected from the group consisting of natural rubber and dienic synthetic rubber;
(b) 0.1-5.0 parts by weight of alkadiene sulfone; and
(c) 0.05-1.0 parts by metal weight of at least one metal salt of an organic acid selected from the group consisting of cobalt salt of an organic acid and nickel salt of an organic acid.

2. The pneumatic radial tire as in claim 1, wherein said alkadiene sulfone is used in an amount of from 0.1-1.5 parts by weight.

3. The pneumatic radial tire as in claim 1, wherein said alkadiene sulfone is selected from the group consisting of piperylene sulfone, 1,3-dimethylbutadiene sulfone, 2,3-dimethylbutadiene sulfone, 2,4-hexadiene sulfone, butadiene sulfone and isoprene sulfone.

4. The pneumatic radial tire as in claim 1, wherein said organic acid provided for the metal salts of an organic acid is selected from the group consisting of naphthenic acid, stearic acid, palmitic acid, oleic acid, linoleic acid, 2-ethylhexanoic acid, resin acid, abietic acid, tall oil acid, neodecanoic acid, versatic acid and primary fatty acids having 6-10 carbon atoms.

5. The pneumatic radial tire as in claim 4, wherein said primary fatty acid having 6-10 carbon atoms is selected from the group consisting of caproic acid, isocaproic acid, enanthic acid, caprylic acid, isocaprylic acid, pelargonic acid, capric acid and isocapric acid.

6. The pneumatic radial tire as in claim 1, wherein the rubber composition comprising more than 3 parts by weight ZnO.

* * * * *